United States Patent
Bishop et al.

(10) Patent No.: US 7,232,094 B2
(45) Date of Patent: Jun. 19, 2007

(54) METHOD AND DEVICE FOR ADAPTING THE SEAT ROW ARRANGEMENT IN PASSENGER PLANES ACCORDING TO NEED

(75) Inventors: Peter Bishop, Hamburg (DE); Noureddine Madoui, Hannover (DE)

(73) Assignee: Bishop GmbH, Hamburg (DE)

( * ) Notice: Subject to any disclaimer, the term of this patent is extended or adjusted under 35 U.S.C. 154(b) by 400 days.

(21) Appl. No.: 10/934,766

(22) Filed: Sep. 7, 2004

(65) Prior Publication Data

US 2005/0061914 A1    Mar. 24, 2005

(51) Int. Cl.
*B64D 11/06* (2006.01)

(52) U.S. Cl. .............................. 244/118.6; 297/217.3; 297/248; 297/257

(58) Field of Classification Search ............. 244/118.5, 244/118.6, 122 R; 297/217.3, 217.7, 243, 297/248, 257
See application file for complete search history.

(56) References Cited

U.S. PATENT DOCUMENTS

| | | | |
|---|---|---|---|
| 4,936,527 A | | 6/1990 | Gorges |
| 5,383,630 A | * | 1/1995 | Flatten .................... 244/118.6 |
| 5,611,589 A | * | 3/1997 | Fujii et al. .................... 296/64 |
| 5,673,973 A | * | 10/1997 | Marechal .................. 297/452.4 |
| 7,137,594 B2 | * | 11/2006 | Mitchell et al. .......... 244/118.6 |
| 2004/0036330 A1 | * | 2/2004 | Itami et al. .................. 297/243 |
| 2006/0102785 A1 | * | 5/2006 | Butt ........................ 244/118.6 |

FOREIGN PATENT DOCUMENTS

| | | |
|---|---|---|
| EP | 0 021 933 | 1/1981 |
| EP | 0 215 495 | 3/1987 |
| EP | 0 282 244 | 9/1988 |
| JP | 02279433 | 11/1990 |
| WO | WO 99/38772 | 8/1999 |

* cited by examiner

*Primary Examiner*—J. Woodrow Eldred
(74) *Attorney, Agent, or Firm*—Nixon & Vanderhye P.C.

(57) ABSTRACT

To allow for optimum arrangement of the rows of seats for any individual flight, the distance between rows is adjusted in the longitudinal direction of the passenger plane, optionally according to sections, by storing in a control device an actually desired arrangement of rows, and automatically displacing (via the control device) every row whose position has to be changed to achieve the actually desired arrangement of rows on its fastening rails to the position determined by the actually desired arrangement of rows. In this way, it is possible to provide a passenger plane, preferably prior to landing, with the data of the actual passenger distribution and the resulting optimum arrangement of rows for the next flight so that it can be prepared after landing for the next flight in the shortest possible time.

18 Claims, 5 Drawing Sheets

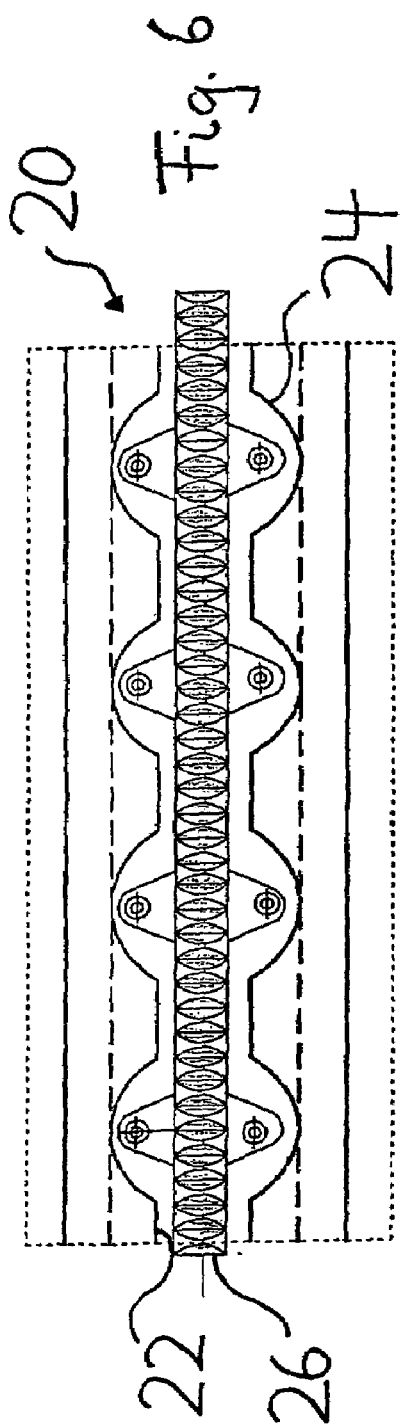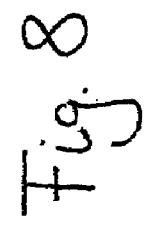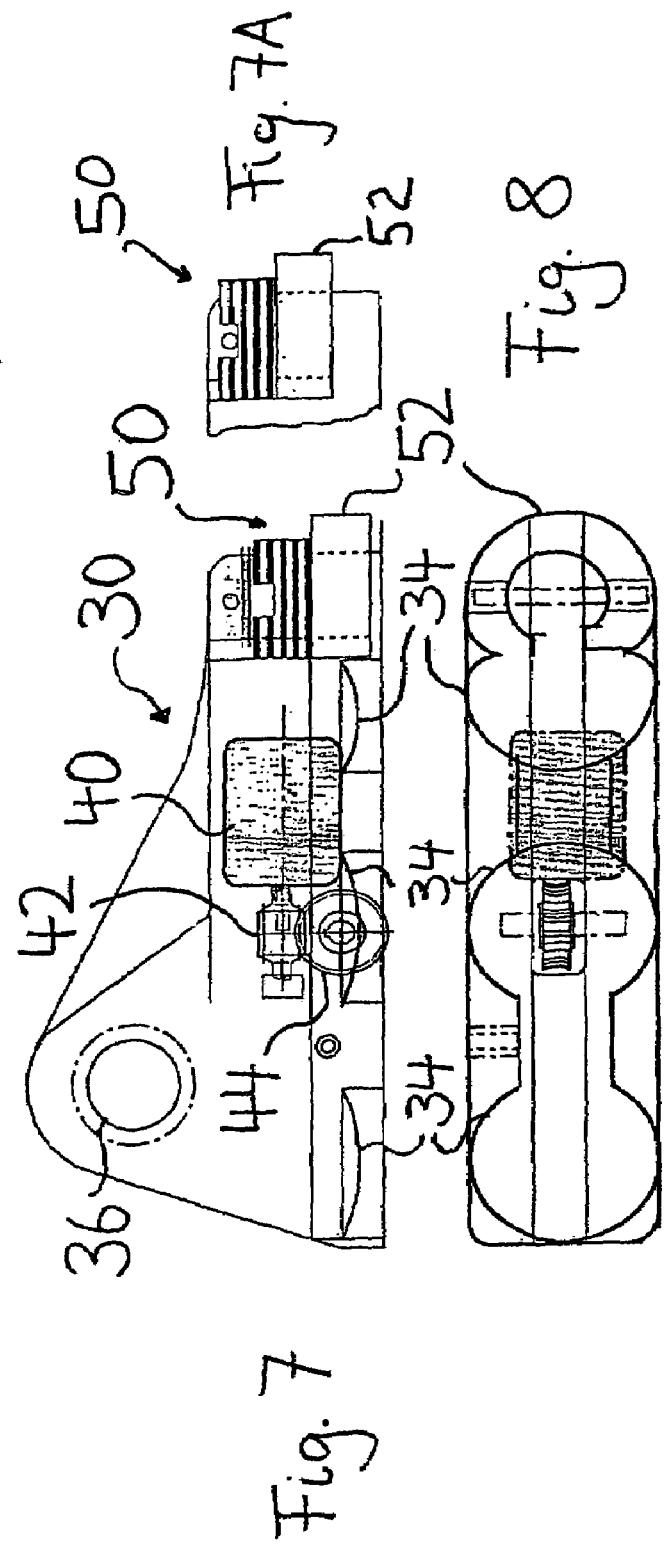

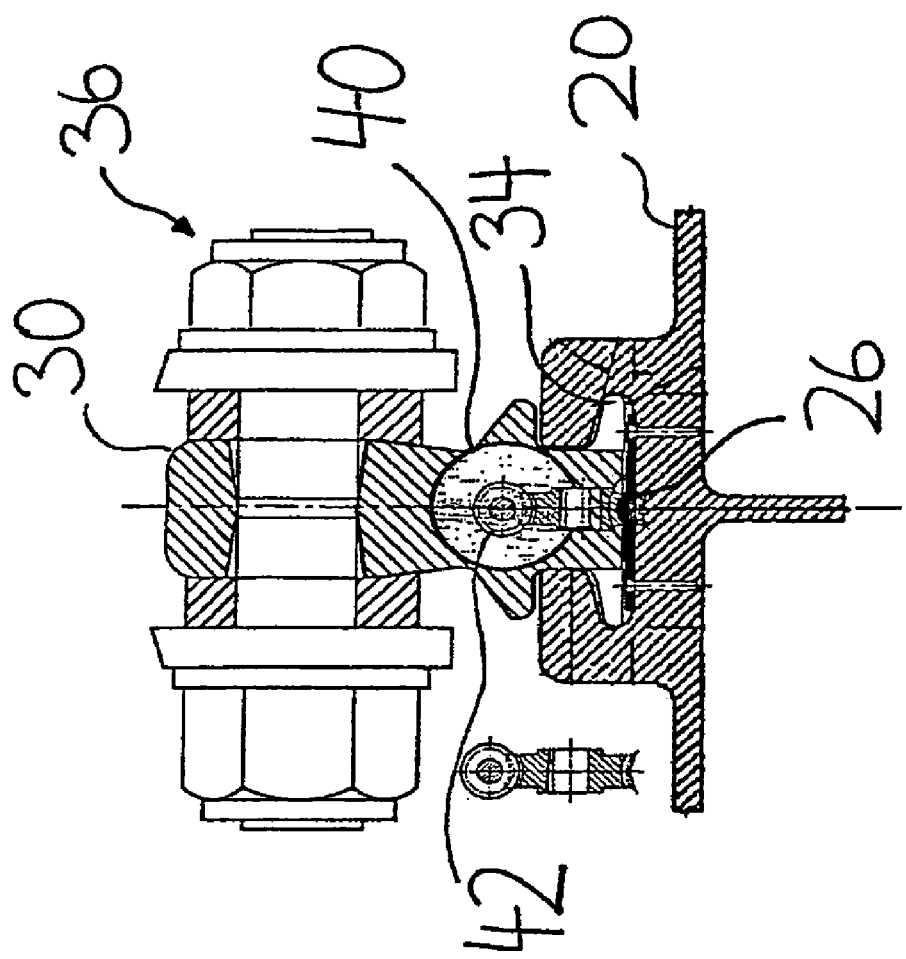

METHOD AND DEVICE FOR ADAPTING THE SEAT ROW ARRANGEMENT IN PASSENGER PLANES ACCORDING TO NEED

CROSS-REFERENCES TO RELATED APPLICATIONS

This application claims the benefit of PCT application no. PCT/EP03/01386 A1, filed 12 Feb. 2003, which in turn claims priority to German application no. 102 11 437.4 filed 5 Mar. 2002, each incorporated herein by reference in its entirety.

STATEMENT REGARDING FEDERALLY SPONSORED RESEARCH OR DEVELOPMENT

None.

BACKGROUND OF THE INVENTION

The present invention relates to a method and apparatus for adapting the seat row arrangement in passenger planes according to need.

In passenger planes, the seat rows are mounted fixedly on fastening rails, which run in the floor in the longitudinal direction of the plane. The plane operator selects a seat row arrangement which is most favorable for the desired intended purpose. Seat row arrangement is understood here as being the number of seat rows and their distances from one another, which may be different in different sections in the longitudinal direction of the plane. As a rule, at the front of the plane there is a Business Class section having larger seat row distances, followed by a generally larger section in Economy Class having smaller seat row distances. Occasionally, continuously uniform seat row distances are also used.

Up to now, the planes have been operated over the long term with a seat row arrangement prescribed once, and the seat row arrangement is changed only under exceptional circumstances if the plane is to be set up, for example, for a new intended purpose and a change in the number of seat rows in Business Class and in Economy Class is to be brought about. Up to now, such changes in the seat row arrangement have been brought about only under exceptional circumstances, since they require a high expenditure in terms of personnel and time because each seat row whose position is to be changed has to be mechanically released from its fastening on the fastening rails, manually displaced and re-fastened by the ground staff. At the same time, if the ratio of seat rows in Economy Class to seat rows in Business Class is changed, seat rows are generally brought into the plane or removed therefrom. It is clear that such conversions entail such high expenditure in terms of personnel and time that they are carried out only in exceptional circumstances.

On the other hand, in the case of the air traffic conditions nowadays when a passenger plane lands at an airport and, after the shortest possible standing time on the ground, sets off again on the return flight to the initial airport or to another airport, situations often arise in which the seat row arrangements with their rigid division into Business Class and Economy Class cannot be used in an economically favorable manner. For example, flights in the early morning or in the evening are often occupied by a high proportion of business travelers in Business Class, while flights on the same routes in the day are more heavily used by Economy Class passengers. In this case, if a relatively large section of seat rows is held ready for Business Class, under flight conditions with a high proportion of economy passengers, the conveying capacity of the plane is not optimally used; on the other hand, at the peak times of Business Class use sufficient seat rows are not available in Business Class.

Accordingly, a need has developed in the art to address one or more problems noted above in the air plane seating industry.

BRIEF SUMMARY OF THE INVENTION

One aspect of the present invention relates to a method in which an adaptation of the seat row arrangement in passenger planes is possible without a substantial increase in the standing time on the ground between two flights.

According to an embodiment of the present invention, a control device is stored with the desired seat row arrangement which is optimum for a particular flight. The control device then automatically moves the seat rows on their fastening rails, so that each seat row is moved to the position predetermined by the currently desired seat row arrangement. In particular, the control device is capable of generating control signals for each seat row whose position is to be changed in order to obtain the currently desired seat row arrangement, which control signals bring about the automatic release of the locking of the particular seat row on its fastening rails. The control signals may also control the operation of driving devices in such a manner that the seat row is moved continuously on the fastening rails to the position predetermined by the currently desired seat row arrangement. Further, actuation of a closure device automatically brings about the re-locking of the seat row in the predetermined position on its fastening rails. The control signals may also be implemented simultaneously for a plurality of seat rows.

This makes it possible for a passenger plane to obtain the data concerning the current passenger distribution and the resultant, optimum seat row arrangement for the next flight, preferably before it lands, so that, after it lands, it can be prepared in the shortest possible time for the next flight. If a change in the number of seat rows is necessary, for example, a few seat rows less is required, then, after removal of the excess seat rows, the control device, which is supplied with the data about the new desired seat row arrangement, on command can move those seat rows, which are to be displaced, automatically and individually under remote control and can re-lock them in the new desired position. If the number of seat rows in Business Class is significantly increased, it may be necessary to remove one or more seat rows from Economy Class; conversely, if the proportion of Business Class seat rows is reduced, it may be desirable to add a few Economy Class seat rows. This operation has to be carried out by the ground staff who receive, in good time before the plane arrives, as soon as the desired seat row distribution on the basis of the passenger occupancy is established, a message from the logistics center of the airline to provide, in the parked position of the plane, a required number of seat rows and to provide staff to remove or add seat rows.

The data about the desired seat row arrangement can be input by the cabin crew via an interface (CIDS—Cabin Interface Device System) or can be transmitted from a logistics center of the airline by remote data transmission, preferably before the plane lands, and fed into the control device, with there being the possibility in the latter case of the crew overwriting individual data via the CIDS.

The control device can be integrated in the avionics system of the plane (IMA—Integrated Modular Avionics). The control device can be realized by computer software which ascertains, by comparison of the present seat row arrangement with the currently desired seat row arrangement arising from the data which has been fed in, which seat rows are to be displaced, and thereupon generates control signals which move the particular seat rows by, first of all, their locking being released by release of the closure device of the seat row from the fastening rails, the seat row then being moved to the desired position by the driving devices, which are controlled by the control signals, and being re-locked there by re-actuation of the closure device.

This adaptation of the seat row arrangement can be carried out on the ground in a very short time without there being a significant increase in the standing time of the plane on the ground. The present invention therefore enables better use of the cabin space of the passenger planes to be obtained by the optimum division into Economy Class and Business Class seat rows being set in each case. Moreover, if a flight is not entirely full and after a few seat rows have been removed, the seat row distance for all of the seat rows can be increased, which improves the seating comfort for all passengers.

For efficient use of the method according to the invention, it is necessary for there to be logistics centers at the airport headed for by the airline, in which centers a certain number of Business Class and Economy Class seat rows are kept ready and can be fitted into an arriving plane before its return flight, or in which seat rows removed from the arriving plane can be stored.

Today's passenger planes can be retrofitted with relatively little outlay in order to implement the present invention, since the fastening rails, which are present nowadays as standard in the cabin floors, for the seat rows may also be used for moving the seat rows. Driving devices for moving the seat rows and closure devices for automatically releasing/locking a seat row from/on the fastening rails and a control device have to be retrofitted.

With embodiments of the present invention, it is also possible for the airlines to offer individual travelers who require it an increased distance from the seat row situated in front. This may be desirable, for example, as a service for increased comfort or as a safety measure for people at risk (risk of thrombosis on long-haul flights).

Furthermore, embodiments of the present invention enable the holding ready of replacement planes for the airlines to be realized more effectively, since, on the one hand, a plane of one type can be set to different passenger capacities and can thus, in principle, replace various other types of plane, as a result of which fewer types of plane have to be held ready as replacement planes. On the other hand, it is possible, in the event of a plane breaking down, for a number of following flights provided in accordance with the schedule to be set to increased capacity and for the passengers of the broken-down plane to be distributed to these following flights.

The term passenger plane is understood for the purposes of the present application as being any plane suitable for conveying people.

These and other aspects/embodiments will be described in or apparent from the following description.

BRIEF DESCRIPTION OF THE DRAWINGS

Preferred embodiments of the invention are explained in greater detail below with reference to examples in the drawings, in which:

FIG. 6 shows a schematic plan view of a fastening rail;

FIG. 7 shows a schematic lateral plan view of a base of a seat row;

FIG. 7A shows the base of FIG. 7 in which the closure device is moved into a raised position;

FIG. 8 shows a schematic plan view from below of the base from FIG. 7;

FIG. 9 shows a cross sectional view of the base from FIG. 7; and

DETAILED DESCRIPTION OF PREFERRED EMBODIMENTS

Figure 1:
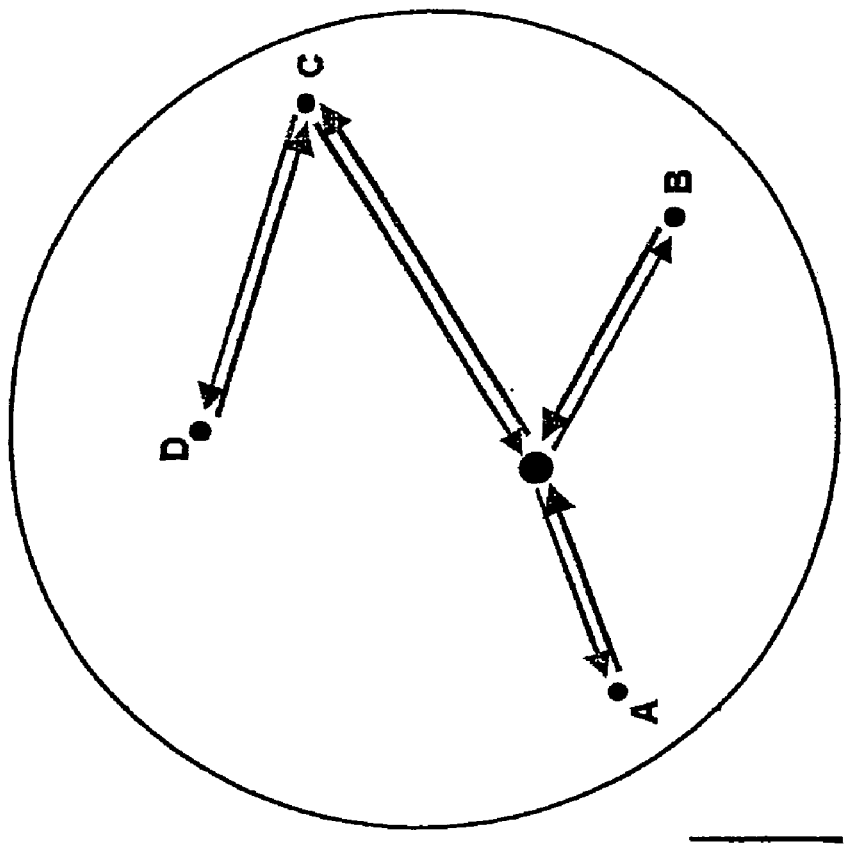
FIG. 1 shows a schematic illustration of flight connections from a hub to various destination airports having different use situations in each case.

FIG. 1 shows a schematic illustration of flight routes between a central hub and destination airports A, B, C and D. By way of example, the starting point here will be a passenger plane whose normal configuration has 30 seats in Business Class and 90 seats in Economy Class. If the current requirements of the connection between the hub and the destination airport A are now considered, it may be the case that, in fact, for the flight from the hub to the destination airport A, 28 Business Class seats and 60 Economy Class seats are required whereas, on the return flight from A to the hub, 35 Business Class seats and 68 Economy Class seats are required. On the other hand, on the connection between the airports C and D, 21 Business Class seats and 60 Economy Class seats may be required. It can readily be seen that, with a standard configuration of the seat row arrangement with a fixed number of Business Class seats and Economy Class seats, an efficient use of the existing cabin space of the passenger plane is not possible, and that it is hardly possible for the same types of plane to be used on different routes.

The seat rows can be moved automatically by a control device, so that a rapid conversion of seat row distances in accordance with the current requirements is possible. The control device may include a program package which is fed into the data processing devices of the plane. This control device obtains the data about the seat row arrangement desired for a relevant flight from a logistics center of the airline at the airport, preferably by remote data transmission; the cabin crew may alternatively or in addition input data via an interface (CIDS) in the plane cabin.

The control device can be integrated in an avionics system of the plane, e.g., the IMA—Integrated Modular Avionics system. A typical prior art avionics system is described in WO 98/13667, published 2 Apr. 1998, incorporated herein by reference in its entirety. The IMA is a standardized system using standardized compatible modules. This system uses shared resources for power supply (PS module), computing operations (CP module), input/output (I/O module), communication and an application program interface. Hardware-independent application software may be implemented in the CP modules with strictly segregated functions.

Figure 10:
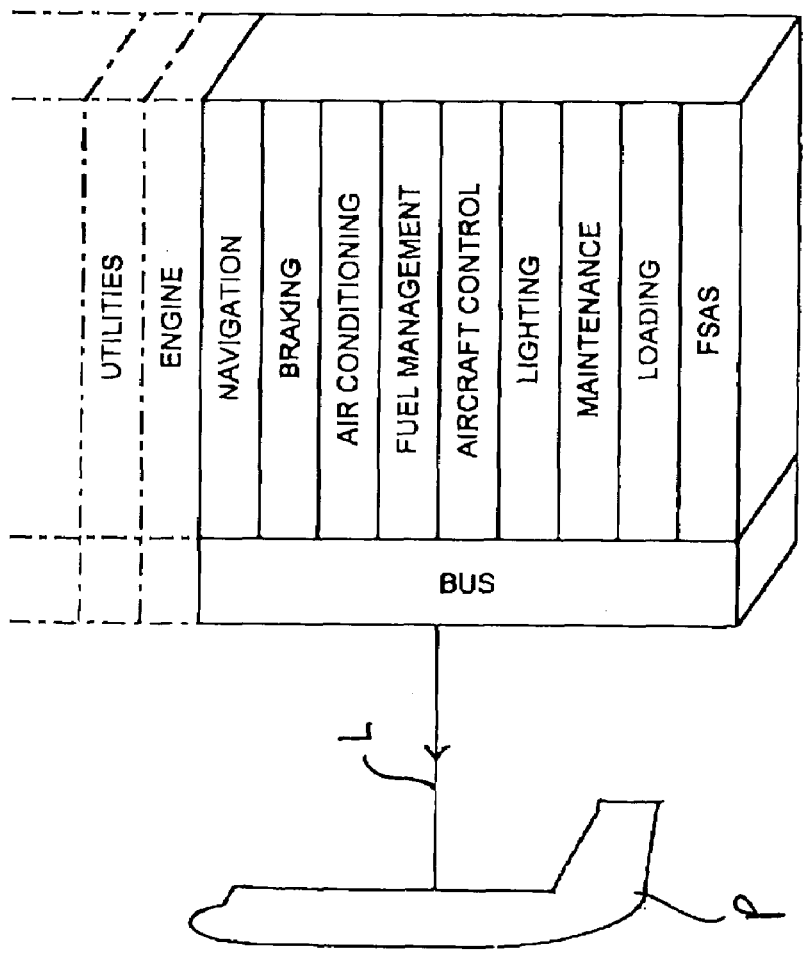
FIG. 10 schematically illustrates a functional block diagram of an avionics system, including one control module block ("FSAS") for the control of movement of seats according to an embodiment of the present invention.

As shown in FIG. 10, which schematically shows an exemplary CP module of the avionics system (IMA), the control functions may include operating programs for utilities, engine, navigation, braking, air conditioning, fuel management, aircraft control, lighting, maintenance, loading, as well as the control program for effecting for the flexible seat arrangement system ("FSAS" in FIG. 10) according to embodiments of the present invention. The control functions may either be implemented in separate computer modules or as separate program sections in a common processing unit. The individual control programs communicate with common bus systems which distribute the control commands to addressed units to perform the required functions. The control device controlling the FSAS method can be implemented in the computer module of the IMA that is already present in current passenger planes.

It should be noted that the line L from the bus to the airplane P is only meant to indicated that the bus system distributes the control commands from the avionics system to the respective units within the airplane that are controlled by the avionics system. The avionics system is of course preferably located inside the airplane.

Each seat device is provided with closure devices with which they can be locked on the fastening rails in the floor of the passenger cabin. These closure devices can have, for example, clamping jaws which engage frictionally on the fastening rails in a lateral direction; for fastening against movements in the flight direction, form-fitting connections are preferably provided between the fastening rails and the closure devices. The closure devices are furthermore provided with a drive which brings the clamping jaws and/or the form-fitting connections into and out of engagement with the fastening rails as soon as a control signal focused on them occurs in the relevant seat device. The closure devices are to be configured in such a manner that they reliably withstand the known acceleration requirements. The stable configuration of such closure devices is well-known to the expert.

The control signals are transmitted by the control device to the seat rows preferably by radio; as an alternative, fastening rails including conductive metal may also themselves be used for passing on the control signals, or cable connections can be used, but the latter signifies a very high outlay in terms of installation, in particular if account is to be taken of the possibility of rapidly fitting or rapidly removing individual seat rows.

Figure 2:
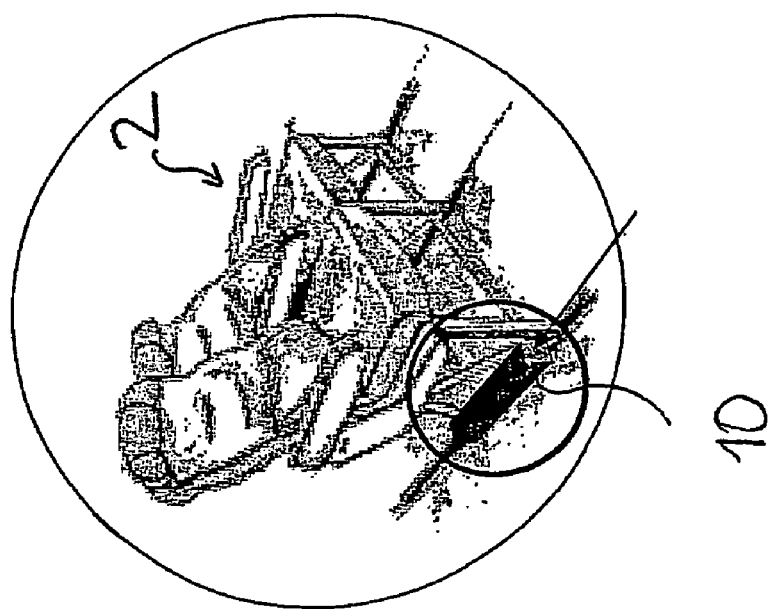
FIG. 2 shows a schematic plan view of a cabin of a passenger plane in section including an enlarged, perspective illustration of a seat row.

If a control signal occurs which is aimed at a certain seat row by means of an appropriate coding or characteristic, then the signal is received by a receiving device in the seat row and is identified as being directed at this seat row; for this purpose, for example, provision may be made for each seat row to be provided with a transponder in which an identifying code for the particular seat row is stored and which can be interrogated by the control device. The control signals then cause the drive to be activated in order to release the locking of the seat row on the fastening rails. Further one or more control signals control the driving devices of the seat row in such a manner that the seat row is moved on the fastening rails by a desired distance to the new predetermined position. As shown in FIG. 2, at the bottom of the seat row 2 a module 10 can be provided, in which receiving devices for the control signals and electric motors of the driving devices are accommodated. The electric motors may, for example, this being discussed further below in an exemplary embodiment, use pinions to enter into engagement in fixed racks in the fastening rails in the plane floor, as a result of which a slip-free transmission is ensured. In this case, the signals from rotational value sensors of the electric motors may also be used in order to provide the control device with feedback over the number of rotations and therefore over the distance covered, from which the current position of the seat row can be determined very precisely in each case. As an alternative, a sensor can detect the distance covered in each case by scanning the fastening rail, so that the particular position of the seat row can be updated in the control device.

As a driving device for the selective displacement of individual seat rows, it is possible, as an alternative to driving motors in each seat row, to provide a control cable encircling the cabin floor in the longitudinal direction. If a seat row is to be displaced, this can be brought about by the seat row which is to be displaced entering into engagement with the control cable in response to a corresponding control signal from the control device in order then to be pulled by the control cable by the desired distance, after which it is released again from the control cable.

After the end of the movement of the seat row predetermined by the control device, the closure devices are closed again, so that the seat row is then securely anchored again in its new position.

FIG. 6 shows a fastening rail 20 schematically in a view from above and partially in ghosted view. Fastening rails are internationally standardized in passenger planes. As hollow rails, they have a channel whose lateral boundaries are illustrated by dashed lines in FIG. 6 and which is partially closed at the top, thus forming an opening gap 22 which is widened at regular distances of 1 inch to form circular openings 24. These circular openings 24 serve to be able to introduce the sliding bodies at the base of a seat row into the fastening rail. Displacement of the base, so that the sliding bodies lie in regions between circular openings 24 and the fastening rail, achieves a form-fitting engagement for locking against movement transversely and vertically with respect to the longitudinal direction of the fastening rail. To this extent, the construction of the fastening rails is identical to the fastening rails used internationally nowadays in passenger planes.

In order to permit the individual seat rows to be drivable, in the present embodiment a rack 26 is fitted to the bottom of the fastening rail 20.

FIGS. 7 to 9 show a base for engagement in a fastening rail, specifically in lateral plan view in FIG. 7, in plan view from below in FIG. 8 and in cross section in FIG. 9. The seat row is fitted on the base 30 via bolts 36 (see FIG. 9). The base 30 has an essentially disc-shaped sliding body 34 which can be introduced into the openings 24 in the fastening rail. If the seat row is situated in a position, so that the sliding bodies 34 lie in openings 24 of the fastening rail, then the seat row can be raised together with its base 30 out of the fastening rail or can be inserted into it. The module 10 in FIG. 2 includes one or more of the components shown in FIGS. 7 and 8.

In this exemplary embodiment, an electric motor 40, which drives a driving pinion 44 via a worm gear 42, serves as the driving device for the seat row. The driving pinion 44 engages in the rack 26 at the bottom of the fastening rail 20. Selective operation of the electric motor 40 that is activated by the control device enables the seat row to therefore be moved into a precisely predetermined position in the fastening rail.

In this exemplary embodiment, the closure device for locking the seat row against movements in the longitudinal direction in the fastening rail is constructed as follows. The closure device 50 has a closure pin 52 which is suspended in a vertically movable manner at the front of the base 30. The closure pin 52 has an annular body with an external shape which essentially completely fills an opening 24 of the fastening rail 20. In the rest position, the closure pin 50 sits in an opening 24 and thereby locks the base 30 against longitudinal movements in the fastening rail 20. In order to release the locking, the closure pin 50 can be raised by a solenoid, as shown in FIG. 7A, so that it comes free from the opening 24. As a result, the locking is released and the base 30 can is movable in the longitudinal direction of the fastening rail 20 and can be moved therein. The closure pin 52 is preferably acted upon by a spring force which presses it downward into the locked position in an opening 24. This ensures that, in the event of malfunction, for example failure of the power supply, the closure pin always remains locked.

Figure 5:
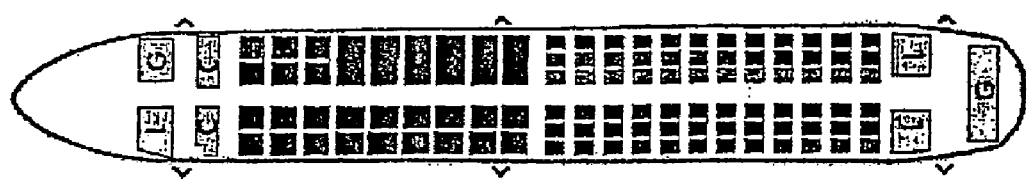
FIGS. 3–5 in each case show a plan view of a cabin in section having different seat row arrangements in each case.
Figure 4:
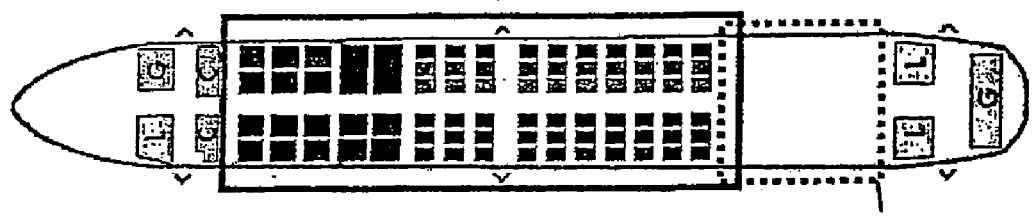
Figure 3:
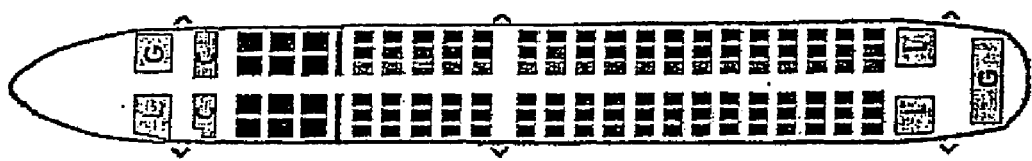

FIGS. 3 to 5 illustrate, by way of example, various seat row arrangements which can be realized in a plane. FIG. 3 shows, as starting point, a seat row arrangement having six seat rows in Business Class (seats situated next to one another on one side of the aisle are referred to as a seat row), and 26 seat rows in Economy Class. If it turns out for a certain flight, e.g. from the hub to the destination airport A, that 18 seats have been booked in business Class and 60 seats in Economy Class, then the seat row arrangement illustrated in FIG. 4 can be set. For this purpose, it is first of all necessary that, after the plane has landed, 16 Economy Class seat rows at the rear of the plane are removed by the ground staff and brought out through its rear entrances. Automatic displacement of all of the remaining Economy Class seat rows to the rear then enables space to be provided at the front for four Business Class seat rows which are carried through the front doors and placed onto the fastening rails. The seat row arrangement illustrated in FIG. 4 is then provided, in which a relatively large free space remains in the rear of the plane. This free space can be used either in another way on the flight concerned, or it is easily possible, with the present invention, to increase the seat row distances both in Business Class and in Economy Class in order thus to increase the comfort of all of the passengers. In the example illustrated, the standard distances of 36 inches in Business Class and 31 inches in Economy Class could thus be increased to 50 inches for Business Class and 40 inches for Economy Class. It can easily be understood that a significant increase in the comfort of the passengers can thereby be achieved for the many flights which are not completely booked up, this of course being a competitive advantage and effective advertising for the airline.

FIG. 5 then illustrates the situation for the return flight from the airport A to the hub, with, for this specific flight, 35 seats being required in Business Class and 68 seats in Economy Class. Correspondingly, after landing at the airport A, space has to be provided, by displacing the Economy Class seat rows forward, for eight Business Class seat rows which are provided and fitted by the ground staff. Furthermore, four Economy Class seat rows have to be provided and fitted. Desired changes in the seat row distances can then be implemented using the method according to the invention.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

The invention claimed is:

1. A method for adapting a seat row arrangement in a passenger plane according to a desired seat row arrangement, in which seat row distances are set in the longitudinal direction in the passenger plane, said distances optionally differing in some sections, said plane including an avionics system for navigation and/or flight control, the method comprising:

storing a currently desired seat row arrangement in a control device integrated into the avionics system of the plane; and automatically moving each seat row whose position is to be changed to obtain the currently desired seat row arrangement, under control by the control device, on fastening rails, to the position predetermined by the currently desired seat row arrangement.

2. The method as claimed in claim 1, further comprising:

generating, via the control device, at least one control signal for each seat row whose position is to be changed in order to obtain the currently desired seat row arrangement;

releasing the locking of the seat row on the fastening rails in accordance with the control signal, by control of a drive device in such a manner that the seat row is moved on the fastening rails to the position predetermined by the currently desired seat row arrangement; and actuating a closure device for the re-locking of the seat row in the predetermined position on the fastening rails.

3. The method as claimed in claim 2, wherein, if the desired seat row arrangement has more or fewer seat rows than currently present, a corresponding number of seat rows are removed from the passenger plane or installed in the passenger plane.

4. The method as claimed in claim 1, wherein the avionics system comprises an Integrated Modular Avionics (IMA) system.

5. The method as claimed in claim 1, wherein the currently desired seat row arrangement is configured for input by an air crew via an interface.

6. The method as claimed in claim 5, wherein the interface comprises a Cabin Interface Device System (CIDS).

7. The method as claimed in claim 1, wherein the currently desired seat row arrangement is transmitted to the passenger plane from a logistics center of the airport by remote data transmission and is stored in the control device.

8. A passenger plane for the implementation of the method as claimed in claim 1, having at least one electronically controllable closure device to lock each seat row on the fastening rails, and having at least one driving devices for the selective, continuous moving of each seat row to a desired position.

9. The passenger plane as claimed in claim 8, further comprising, for each seat row, at least one electric motor for the driving device and with at least one electromagnetic drive for the closure device.

10. The passenger plane as claimed in claim 8, further comprising a data processing system including a program to carry out functions of the control device.

11. A method for adapting a seat row arrangement in a passenger plane according to a desired seat row arrangement, in which seat row distances are set in a longitudinal direction in the passenger plane, said distances optionally differing in some sections, the plane including an avionics system for navigation and/or flight control, the method comprising:

storing in a control device a currently desired seat row arrangement;

automatically moving each seat row whose position is to be changed on fastening rails to the position predetermined by the currently desired seat row arrangement, in accordance with the control device, to obtain the currently desired seat row arrangement;

integrating the control device in the avionics system of the plane; and transmitting the currently desired seat row arrangement for the next flight from a logistics center of the airport by remote data transmission to the passenger plane before it lands and is stored in the control device.

12. The method as claimed in claim 11, further comprising:

generating, via the control device, at least one control signal for each seat row whose position is to be changed in order to obtain the currently desired seat row arrangement, which control signal (a) brings about the automatic release of the locking of the seat row on the fastening rails, (b) controls the operation of a driving device in such a manner that the seat row is moved on the fastening rails to the position predetermined by the currently desired seat row arrangement, and (c) brings about the actuation of a closure device for the re-locking of the seat row in the predetermined position on its fastening rails.

13. The method as claimed in claim 12, wherein, if the desired seat row arrangement has more or fewer seat rows than currently present, a corresponding number of seat rows are removed from the passenger plane or installed in the passenger plane.

14. The method as claimed in claim 11, wherein the currently desired seat row arrangement is configured for input by the air crew via an interface.

15. The method as claimed in claim 14, wherein the interface comprises a Cabin Interface Device System (CIDS).

16. The method as claimed in claim 11, wherein the avionics system comprises an Integrated Modular Avionics system (IMA).

17. A passenger plane for the implementation of the method as claimed in claim 11, said passenger plane comprising:

at least one electronically controllable closure device to lock each seat row on the fastening rails;

a driving device for the selective and continuous moving of each seat row to a desired position; and a program that is operable in a data processing system of the plane, said control device being configured to perform at least one function via the program, the program being integrated in the avionics system and being configured for the purpose of receiving and storing the currently desired seat row arrangement for the next flight which is transmitted to the passenger plane from a logistics center of an airport by remote data transmission before the plane lands.

18. The passenger plane as claimed in claim 17, wherein each seat row is provided with an electric motor for the driving device and with an electromagnetic drive for the closure device.

* * * * *

UNITED STATES PATENT AND TRADEMARK OFFICE
CERTIFICATE OF CORRECTION

PATENT NO. : 7,232,094 B2  
APPLICATION NO. : 10/934766  
DATED : June 19, 2007  
INVENTOR(S) : Peter Bishop et al.

Page 1 of 1

It is certified that error appears in the above-identified patent and that said Letters Patent is hereby corrected as shown below:

Title page, Related U.S. Application Data should read as follows;

item (62) Continuation of PCT/EP03/01386, filed Feb. 12, 2003

Title page, Foreign Application Priority Data should read as follows;

item (30) March 5, 2002   (DE)        102 11 437.4

Signed and Sealed this  
Seventeenth Day of July, 2012

David J. Kappos  
*Director of the United States Patent and Trademark Office*